United States Patent [19]
Jenkins et al.

[11] 3,853,795
[45] Dec. 10, 1974

[54] QUASC-PREPOLYMERIZATION TECHNIQUE FOR PREPARATION OF POLYURETHANE FOAMS

[75] Inventors: Victor Frederick Jenkins, St. Albans; Stephen Arthur Lee, Dunstable, both of England

[73] Assignee: Laporte Industries Limited, London, England

[22] Filed: July 13, 1973

[21] Appl. No.: 378,834

Related U.S. Application Data

[63] Continuation-in-part of Ser. No. 253,589, May 15, 1972, abandoned.

[30] Foreign Application Priority Data
May 27, 1971  Great Britain..................... 17609/71

[52] U.S. Cl. ...................... 260/2.5 AC, 260/2.5 BD
[51] Int. Cl............................................. C08g 22/48
[58] Field of Search.................. 260/2.5 AC, 2.5 BD

[56] References Cited
UNITED STATES PATENTS
3,645,924   2/1972   Fogiel............................ 260/2.5 AC OTHER PUBLICATIONS
McElroy, "The Techniques of Prepolymer Formation," Mobay Chemical Co., pages 1 to 8, published no later than October 21, 1959.

Primary Examiner—Melvyn I. Marquis
Assistant Examiner—C. Warren Ivy
Attorney, Agent, or Firm—Larson, Taylor and Hinds

[57] ABSTRACT

High density polyurethane foam is prepared by a quasiprepolymer technique. A "prepolymer composition" is formed by polymerising an organic polyol with a polyisocyanate and then adding a relatively large quantity of organo-tin catalyst (0.02 to 1% by weight) thereto, and is then reacted with a "reactant mixture" comprising an organic polyol, a polyfunctional cross linking agent, a blowing agent and 0.01 to 4% by weight of tertiary amine catalyst. By distributing the two catalysts between the prepolymer compositions and the reactant mixture in this manner, the two liquid compositions are stable, but, when mixed, the catalyst acts synergistically to give extremely low demould times for the foam.

10 Claims, No Drawings

QUASC-PREPOLYMERIZATION TECHNIQUE FOR PREPARATION OF POLYURETHANE FOAMS

CROSS REFERENCE TO RELATED APPLICATION

This application is a continuation-in-part application of our previous application Ser. No. 253,589 now abandoned, The present invention relates to polymers, in particular to a process for preparing polyurethane foams.

More specifically but not exclusively the invention is concerned with the preparation of high density foams, "high density" being defined as a density greater than 0.3g/ml and normally less than 0.7g/ml.

A convenient process which has the advantages of enabling the reaction to be fairly easily controlled is the so-called two shot or quasi-prepolymer process. In this process a prepolymer is produced by reacting an excess of organic polyisocyanate with a polyol then subsequently combining it with a reactant mixture containing more polyol in order to form the complete polyurethane structure and a blowing agent to form the foam structure. Catalysts are normally added to the latter stage of this process in order to try and control the absolute and relative rates of the polyurethaneforming and foam structure-forming reactions. One catalyst which has been very widely used is the tertiary amine 1,4 diazobicyclo (222) octane and when it is used it is almost invariably added to the reactant mixture rather than to the prepolymer. The reason for this is that when the catalyst was added to the prepolymer the viscosity of the prepolymer increased and hence its storage stability decreased. Organo-tin compounds are known to catalyse the isocyanate-polyol reaction much more than 1,4 diazobicyclo (222) octane but they are rarely used in two shot processes because it has been found that on adding them to the reactant mixture the reactivity of the system decreases on storage. It will be appreciated that in a two stage process it is very important that the products of the first stage, which are to be combined in the second stage, are stable in the presence of the catalyst or catalysts for considerable periods. Furthermore the prepolymer and reactant mixture together with the catalyst or catalysts may need to be stored at temperatures of 50°C to 80°C in order to keep them in a liquid state and hence they should be stable at these temperatures also.

In "The Techniques of Prepolymer Preparation", Mobay Chemical Company, W. R. McElroy discloses that organo-tin compounds can be used as catalysts in the preparation of the prepolymer in order to reduce the processing time in making polyether prepolymers, but warns that such catalysts can affect the side reactions in the prepolymer formation which result in gelling of the prepolymer. For this reason if has hitherto been considered undesirable to use large quantities of organo-tin catalysts in the prepolymer.

U.S. Pat. No. 3,645,924 issued to A. W. Fogiel on Feb. 29, 1972 also discusses the possibility of using a quasi-prepolymer technique in the preparation of polyurethane coating compositions and low density, open cell polyurethane foams. Guanidines are used as the catalyst and are contained in the reactant mix. Fogiel also suggests that small quantities (0.001 to 0.01% by weight of the prepolymer) of urethane forming catalysts such as dibutyl tin dilaurate can be added to the ingredients of the prepolymer to hasten the formation of the prepolymer from polyols which contain secondary hydroxyl compounds. The catalyst systems of Fogiel do not however cause rapid foam-formation, typical "rise times" for the foam (i.e. the time taken for the foam to expand) being at least 1½ minutes and frequently more than 2 minutes.

A further limitation of organo-tin compounds is that they are very poor catalysts for the normal foamforming, isocyanate-water, reaction.

By contrast with the prior art discussed above we have found that closed-cell high-density polyurethane foams can be produced with very low reaction times from a two shot system in which both ingredients are stable by using relatively large quantities of an organo tin compound as catalyst in the prepolymer and a tertiary amine catalyst in the reactant mix.

The "prepolymer" is defined as the reaction product of a molar excess of organic polyisocyanate, preferably a diisocyanate, with an organic polyol. A particularly suitable diisocyanate is 44' diisocyanato diphenyl methane but it is also possible to use other diisocyanates such as tolylene diisocyanates, diisocyanato dicyclohexyl methane or hexamethylene diisocyanate. The organic polyol may advantageously be a polyester or a polyether and particularly suitable are polyethylene adipate, polycaprolactone or a copolymer of a lactone with an epoxide prepared as described in co-pending U.S. Pat. application Ser. No. 244 332. If the polyol is the copolymer, the lactone is preferably $\epsilon$-caprolactone and the epoxide is conveniently ethylene oxide. The terms organic polyisocyanate and organic polyol may refer to a mixture of two or more compounds.

The "reactant mixture" comprises an organic polyol, a polyfunctional cross-linking agent which is preferably a low molecular weight diol such as butane 1,4diol or ethane diol, and a blowing agent which is conveniently water. The organic polyol may be the same compound or compounds used in preparing the prepolymer or it could be different.

The essential feature of this invention which provides the critical difference between our process and processes of the prior art as illustrated by Fogiel is the distribution of the catalysts between the prepolymer and the reactant mix. We include a tertiary amine catalyst in the reactant mix and an organo-tin catalyst in the prepolymer, the organo-tin catalyst being added after the prepolymer has formed and constituting from 0.02 to 1% by weight of the prepolymer. The quantity of organo-tin compound which we use contrasts with the small quantities, less than 0.01% by weight, used by Fogiel and serves a completely different purpose from the organo-tin compounds hitherto used in the prior art. Previously, the organo-tin compounds were added prior to the formation of the prepolymer in order to hasten the formation of the prepolymer. We however add organo-tin compound after the prepolymer has formed in sufficient quantities to enable the organo-tin compound to act synergistically with the tertiary amine catalyst contained in the reactant mix to catalyse the formation of the foam from the prepolymer and the reactant mix. As a result, we find that the formation of the foam is much quicker than either the known processes which use a tertiary amine catalyst or organo-tin catalyst alone or the known processes in which both tertiary amine and an organo-tin compound are used, such as that disclosed by Fogiel wherein the organo-tin compound is used in small quantities merely to catalyse the formation of the prepolymer.

So effective is the catalyst system of our invention that a "demould time" of less than two minutes and frequently of about one minute is readily obtained. The "demould time" is defined as that period between the time at which the reactants are poured into a mould and the time at which the foamed product is able to support a force of 5 Kg/cm$^2$ without deformation. It will be appreciated that this period not only includes the "rise time" of the foam but also a period during which the foam cures to a relatively non-deformable structure. Thus the 2 minute "demould times" obtained in accordance with this invention are a distinct improvement over the 2 minute "rise times" obtained by the prior art methods.

A further advantage of our invention is that the reactant mix and the prepolymer are both stable liquid systems which can be handled easily. That the prepolymer is stable even in the presence of relatively large quantities of organo-tin is unexpected in view of the previous teachings that large quantities of organo-tin compounds in a prepolymer system could cause gelling. The reactivity of the prepolymer with the reactant mixture does not decrease on storage even at 50° to 80°C for periods of 72 hours.

Of the many tertiary amines known to be suitable for use as catalyst in the preparation of polyurethane foams from a prepolymer and a reactant mixture we prefer to use 1,4 diazobicyclo (222) octane, though other tertiary amines, in particular dimethyl cyclohexylamine, are suitable.

Many organo-tin catalysts are available and could be used with effect in the present invention. Dibutyl tin dilaurate is a preferred compound but other such as dialkyl tin compounds generally and in particular dioctyl tin dilaurate are suitable.

The amount of tertiary amine used would normally be in the range of from 0.01 to 4% by weight of the reactant mixture, advantageously from 0.05 to 2%. The organo-tin catalyst is suitably present in an amount in the range of from 0.02 to 1% by weight of the prepolymer, advantageously from 0.02 to 0.05%.

It is often advantageous to introduce one or more substances to act as surfactants or pigments. Normally any of these substances used are dissolved or suspended in the prepolymer or the reactant mixture before the mixing stage. Surfactants which have proven effective are those known in the trade as Silicone L-520 and Silicone L5302 (supplied by Union Carbide). Typically the pigment may be carbon black.

The prepolymer and reactant mixture formulated in accordance with the present invention are conveniently mixed together at a temperature in the range of from 20°C to 100°C, preferably from 30°C to 80°C and most preferably at approximately 50°C. In those cases in which the reactant mixture and prepolymer are mixed and put into a mould, the mould is also heated so that the temperature of the reactants does not alter because of the heat capacity of the mould.

Our invention will now be illustrated by example only in order that the invention may be more clearly understood. Examples 1 and 2 and 4 are comparative examples not within the scope of the present invention.

In each example the organic polyol used in making the prepolymer and as a constituent of the reactant mixture is a copolymer of ε-caprolactone and 20% by weight of ethylene oxide having a hydroxyl number of 55mg KOH/g and was prepared by the method of co-pending U.S. Pat. application Ser. No. 224,332 using neopentyl glycol as initiator, now U.S. Pat. No. 3,795,701.

EXAMPLE 1

The copolymer (58g) was reacted with 4,4' diisocyanato diphenyl methane (58g) at 80°C for 1 hour. The prepolymer thus formed was then maintained at 50°C. A reactant mixture was made consisting of the copolymer (71.0g), butane 1,4 diol (13.0g), Silicone L5302 (1.0g), water (0.24g) and, as a catalyst, 1,4 diazobicyclo (222) octane (1.0g) and was heated to 50°C.

After storage of both the prepolymer and reactant mixture for 1 day at 50°C a sample of the prepolymer (33.5g) was mixed with rapid stirring over a period of 5 seconds with a sample of reactant mixture (25g). A demould time of 2 minutes was obtained. After storing for another 9 days on repeating the mixing with further samples a demould time of 1¾ minutes was obtained.

This example shows that a catalyst of 1.0g of 1,4 diazobicyclo (222) octane in the reactant mixture shows storage stability and demould times which although acceptable, could with advantage be lower.

EXAMPLE 2

A prepolymer was prepared as described in Example 1. A reactant mixture was prepared as described in Example 1 except that the catalyst consisted of a mixture of 1,4 diazobicyclo (222) octane (0.1g) and dibutyl tin dilaurate (0.30g). The reactant mixture and the prepolymer were each stored at 50°C.

After periods of 0, 3 and 9 days after these preparations, the prepolymer (33.5g) and the reactant mixture (25g) were mixed with rapid stirring over a time of 5 seconds. A closed mould of volume 57 mls was preheated to 50°C and charged with the mixture (37g). The following demould times were obtained.

| No. of days of storage of reactant mixture and prepolymer at 50°C | Demould Time (mins.) |
| --- | --- |
| 0 | 1½ |
| 3 | 5 |
| 9 | 30 |

This example illustrates that using a catalyst mixture of 1,4 diazobicyclo (222) octane (0.1g) and dibutyl tin dilaurate (0.30g) both in the reactant mixture leads to unsatisfactory storage stability.

EXAMPLE 3

A prepolymer was prepared as described in Example 1 except that a catalyst of dibutyl tin dilaurate (0.30g) was added. The prepolymer was stored at 50°C.

A reactant mixture was prepared as described in Example 1 except that the amount of the catalyst, 1,4 diazobicyclo (222) octane was reduced from 1.0g to 0.1g. The reactant mixture was stored at 50°C.

After periods of 0 and 10 days after preparation and storage at 50°C, the prepolymer (33.5g) and reactant mixture (25g) were mixed for 5 seconds and the demould times determined.

| No. of days of storage of reactant mixture and prepolymer at 50°C | Demould Time (mins.) |
| --- | --- |
| 1 | 1 |
| 10 | ¾ |

Thus the process of the present invention shows that lower demould times can be obtained with less catalyst than in the prior art process illustrated in Example 1.

EXAMPLE 4

A prepolymer was prepared as described in Example 1. 0.0035 grams of dibutyl tin dilaurate were then added to the resulting prepolymer and the prepolymer mixture was stored at 50°C. A reactant mixture was prepared as described in Example 1 and stored at 50°C.

After both the prepolymer mixture and the reactant mixture had been standing for 1 day at 50°C, a sample of the prepolymer mixture (33.5g) was mixed with rapid stirring over a period of 5 seconds with a sample of the reactant mixture 25.0g) to form a foam. The foam had a demould time of 2 minutes.

This example shows that a prepolymer mixture which contains smaller quantities of dibutyl tin dilaurate than required by the present invention processes foams with relatively long demould times.

We claim:

1. A process for the preparation of a substantially closed cell high density polyurethane foam which comprises the steps of:
   a. preparing a prepolymer from an organic polyol and an organic polyisocyanate.
   b. adding to said prepolymer after the formation thereof from 0.02 to 1% by weight of an organo-tin catalyst based on the weight of the prepolymer thereby to obtain a stable liquid prepolymer composition
   c. preparing a reactant mixture containing an organic polyol, a polyfunctional cross-linking agent and a blowing agent,
   d. incorporating in said reactant mixture from 0.01 to 4% by weight of a tertiary amine catalyst thereby to obtain a stable liquid reactant mixture, and
   e. reacting said prepolymer composition with said reactant mixture to form a polyurethane foam.

2. A process according to claim 1 wherein said process is carried out at a temperature of from 20°C to 100°C.

3. A process according to claim 2 wherein said process is carried out at a temperature of from 30° to 80°C.

4. A process according to claim 1 wherein the amount of tertiary amine catalyst incorporated in said reactant mixture is in the range 0.05 to 2% by weight of the reactant mixture.

5. A process according to claim 1 wherein the amount of organo-tin catalyst added to said prepolymer is in the range 0.02 to 0.5% by weight of the prepolymer.

6. A process according to claim 1 wherein the tertiary amine catalyst is 1,4 diazobicyclo (222) octane.

7. A process according to claim 1 wherein the tertiary amine catalyst is dimethyl cyclohexylamine.

8. A process according to claim 1 wherein the organo-tin catalyst is a dialkyl tin compound.

9. A process according to claim 8 wherein the organo-tin catalyst is dibutyl tin dilaurate.

10. A process according to claim 8 wherein the organo-tin catalyst is dioctyl tin dilaurate.

* * * * *